United States Patent [19]

Anderson

[11] Patent Number: 5,026,485

[45] Date of Patent: Jun. 25, 1991

[54] METHOD OF TREATING WASTEWATER FROM POLYMERIZATION PROCESS

[75] Inventor: Oscar E. Anderson, Parkersburg, W. Va.

[73] Assignee: General Electric Company, Parkersburg, W. Va.

[21] Appl. No.: 501,465

[22] Filed: Mar. 30, 1990

[51] Int. Cl.$^5$ .............................................. C02F 1/52
[52] U.S. Cl. .................................. 210/723; 210/726; 210/904; 210/909
[58] Field of Search ................. 210/723, 726, 904, 909

[56] References Cited

U.S. PATENT DOCUMENTS 2,129,267  9/1938  Fischer .................................. 210/726
4,078,129  3/1978  Yamagata et al. ..................... 526/11

Primary Examiner—Peter Hruskoci
Assistant Examiner—Krisanne Shideler
Attorney, Agent, or Firm—Lowe, Price, LeBlanc & Becker

[57] ABSTRACT

A method is disclosed for treating wastewater from a suspension styrene-acrylonitrile (SAN) copolymerization process. The wastewater contains SAN and polyvinyl alocohol (PVA) as a suspensing agent. The method includes the steps of adding to the wastewater a floc forming effective amount of a) a water soluble borate salt, preferably sodium metaborate and b) a water soluble ferrous salt, preferably ferrous sulfate, and separating the resulting floc which contains the SAN particles and PVA from the treated wastewater.

3 Claims, No Drawings

METHOD OF TREATING WASTEWATER FROM POLYMERIZATION PROCESS

BACKGROUND OF THE INVENTION

1. Field of the Invention

A method of reducing the Chemical Oxygen Demand (COD) of wastewater generated in the production of styrene-acrylonitrile copolymer (SAN) made by the suspension process. The method includes the step of treating the wastewater with a boric acid salt and a ferrous salt both being water soluble.

2. Description of the Prior Art:

In the manufacture of SAN by the suspension process, the monomers are charged into an aqueous mixture containing a suspending agent, usually polyvinyl alcohol. After the copolymer is recovered, the large amounts of polyvinyl alcohol and finely divided SAN particles remaining in the wastewater make pretreatment of the water very difficult.

U.S. Pat. No. 4,078,129 issued on Mar. 7, 1978 (Yamagata et al) describes a method of separating polyvinyl alcohol from solution by coagulating it with a "salting agent" and a salt of boric acid. The salting agent is defined as an inorganic salt of Group I or II metals, an inorganic ammonium salt or an inorganic aluminum salt. While the present invention does use a boric acid salt, it is used in conjunction with a ferrous salt (Group VIII) rather than the class of "salting agents" described in Yamagata et al.

SUMMARY OF THE INVENTION

In the manufacture of SAN by the suspension process, the monomers are charged batchwise into an aqueous solution containing polyvinyl alcohol, a water soluble polymer used as a suspending agent. The solution may also contain wetting agents and mercaptans or other ingredients used to control the reaction and/or the molecular weight or particle size of the copolymer. The reaction proceeds upon the addition of a catalyst accompanied by agitation. As the process name implies, the monomers are copolymerized while in suspension as small beads within the aqueous mixture. The resulting copolymer is recovered after the desired reaction time is reached. Since the polyvinyl alcohol is not a reactant, the wastewater contains substantially all the PVA originally charged as well as a considerable amount of very small particles of SAN.

The treatment of the wastewater presents a serious problem because PVA is difficult to remove or neutralize by conventional techniques; and the very fine particles of SAN which remain are in large part colloidal in nature. These SAN particles will not settle out of solution even if allowed to stand for extended periods of time, i.e. several months. In the present invention, there is provided an effective method of primary treatment to remove the PVA and SAN copolymer, resulting in a dramatic reduction of the COD at relatively low cost.

By way of background, the biochemical oxygen demand (BOD) is a standardized technique of estimating the degree of contamination of water supplies, especially those which are contaminated by sewage and industrial wastes. It is expressed as the quantity of dissolved oxygen (in mg./L.) required during the stabilization of the decomposable organic matter by aerobic biochemical action. Determination of this quantity is accomplished by diluting suitable portions of the sample with water saturated with oxygen and measuring the dissolved oxygen in the mixture both immediately and after a period of incubation, usually five (5) days.

The chemical oxygen detect (COD), a related term, is a measure of the quantity of oxidizable components present in water. Since the carbon and hydrogen, but not the nitrogen, in organic matter are oxidized by chemical oxidants, the oxygen consumed is a measure only of the chemically oxidizable components and is dependent on the oxidant, the structure of the organic compound and the procedure. Since this value does not differentiate stable from unstable organic matter, it does not necessarily correlate with the BOD.

As noted in Yamagata, most waste water treatment is based on the premise that the organic compounds in the industrial wastewater can be decomposed if the wastewater is collected in ponds or the like and then subjected to the action of aerobic organisms. Unfortunately, PVA cannot be removed by such processes and neither can the finely divided SAN particles remaining in the wastewater. The SAN particles are difficult to remove even by ultracentrifugation, a process which, even if effective, would be cost prohibitive.

Yamagata has proposed the use of the combination of a salting agent and a borate salt which reduces the amount of salting agent required. While this may be somewhat effective in reducing the PVA in the wastewater, it is does very little for the suspended SAN solids. The Yamagata process has been tried on SAN wastewater and was found to be much less effective than the process of the present invention.

DETAILED DESCRIPTION OF THE INVENTION

The following examples illustrate specific examples of the invention.

EXAMPLE 1

A typical sample of wastewater from a SAN suspension polymerization process was treated with sodium metaborate and ferrous sulfate in the following manner. The sodium metaborate and ferrous sulfate were first prepared as separate aqueous solutions each containing 30 wt.% of the salts. The sodium metaborate solution was added to the sample in a quantity sufficient to bring the concentration of the sodium metaborate in the final solution to a concentration of 5 gm./L. The solution of ferrous sulfate was added to the wastewater sample (now containing the sodium metaborate) in a quantity sufficient to bring the concentration of ferrous sulfate in the final solution to 3 gm./L. A floc appeared upon the addition and it settled to the bottom of the vessel containing the sample. The clear supernatant may be decanted or the combined floc and liquid may be filtered through a simple glass fiber filter pack (2–3 microns).

EXAMPLE 2

Example 1 was repeated using ferrous ammonium sulfate substituted in place of the ferrous sulfate at the same initial and final concentrations.

CONTROL EXAMPLE 3

Following the procedure described in Yamagata patent referred to above, a control example using aluminum sulfate in place of the ferrous sulfate. The aluminum sulfate is one of the preferred "salting agents" described in the Yamagata patent. The concentrations were the same as used in the previous examples.

CONTROL EXAMPLE 4

Control Example 3 was repeated substituting sodium borate for sodium metaborate.

In order to establish the efficacy of the present invention, tests were run comparing untreated samples one of which a) was allowed to settle, b) another of which was filtered through a glass fiber filter (2–3 microns); c) another of which was filtered through a 0.45 micron filter and d) others treated in accordance with Example 1. The results are set forth in Table I below in which the following abbreviations are employed:

COD=Chemical Oxygen Demand expressed in mg./L.
TS=Total Solids Content in mg./L.
TSS=Total Suspended Solids in mg./L.
TOC=Total Organic Solids in mg./L.
BOD=Biological Oxygen Demand in mg./L.
Color: VW=Very White; W=White; C=Clear

TABLE I

| Sample | COD | TS | TSS | TOC | BOD | Color |
| --- | --- | --- | --- | --- | --- | --- |
| Original Sample | 79000 | 39995 | 38075 | — | 360 | VW |
| Settled 24 Hr. | 22000 | 4675 | 1425 | — | 365 | VW |
| Filtered Glass | 9000 | 2225 | — | 721 | 340 | W |
| Filtered .45 um | 1250 | 410 | — | 418 | 348 | C |
| Example 1 | 850 | 3785 | — | 266 | 347 | C |

In order to compare the salts used in Examples 1 and 2 with Control Examples 3 and 4, samples were prepared with each; and then, after the floc appeared, the mixture of liquid and solids was filtered through a glass fiber filter (2–3 microns). The liquid portion passing through the filter was then analyzed for Total Organic Carbon. The results are set forth in Table II below.

TABLE II

| Sample | TOC |
| --- | --- |
| Example 1 | 266 |
| Example 2 | 330 |
| Control 3 | 388 |
| Control 4 | 482 |

It can be seen from the foregoing that treating SAN wastewater with a water soluble ferrous salt in combination with a water soluble borate salt is very effective in reducing the Chemical Oxygen Demand of the wastewater.

While the invention has been described in connection with certain specific embodiments, it should be construed in accordance with the following claims.

What is claimed is:

1. A method for treating wastewater containing styrene-acrylonitrile particles and polyvinyl alcohol from a suspension styrene-acrylonitrile copolymerization process, said process utilizing polyvinyl alcohol as a suspending agent, comprising the steps of adding to said wastewater a floc forming effective amount of a) a water soluble borate salt and b) a water soluble ferrous salt; and separating the resulting floc containing said particles and polyvinyl alcohol from the treated wastewater.

2. A method as defined in claim 1 wherein said water soluble borate salt is sodium metaborate.

3. A method as defined in claim 1 wherein said water soluble ferrous salt is ferrous sulfate.